United States Patent [19]

Jacobs et al.

[11] Patent Number: 5,372,220
[45] Date of Patent: Dec. 13, 1994

[54] WATER BASED LUBRICANT CONTAINING POLYTETRAFLUOROETHYLENE

[75] Inventors: Bernard Jacobs, Novato; John H. Adams, Crockett, both of Calif.

[73] Assignee: Bostik, Inc., Wilmington, Del.

[21] Appl. No.: 21,396

[22] Filed: Feb. 23, 1993

Related U.S. Application Data

[63] Continuation-in-part of Ser. No. 890,723, Jun. 1, 1992, abandoned.

[51] Int. Cl.⁵ .............................................. F01M 9/00
[52] U.S. Cl. ...................................... 184/6.14; 184/6; 184/54; 184/109
[58] Field of Search ................. 184/6, 6.14, 7.4, 54; 439/589

[56] References Cited

U.S. PATENT DOCUMENTS

| | | | |
|---|---|---|---|
| 3,071,543 | 1/1963 | McGee . | |
| 3,607,878 | 9/1971 | Grimaud | 260/29.6 |
| 3,750,847 | 8/1973 | Sluhan | 184/6.14 |
| 3,925,292 | 12/1975 | Holmes | 260/29.6 F |
| 4,164,474 | 8/1979 | Gallacher et al. . | |
| 4,224,173 | 9/1980 | Reick | 252/52 A |
| 4,311,634 | 1/1982 | Vassiliov | 260/42.27 |
| 4,362,634 | 12/1982 | Berens et al. . | |
| 4,759,861 | 7/1988 | Ogura et al. . | |
| 4,846,985 | 7/1989 | Rizvi et al. . | |
| 5,068,129 | 11/1991 | Smith et al. | 427/239 |
| 5,190,421 | 3/1993 | Wen et al. | 184/6.14 |

OTHER PUBLICATIONS

Campen, M., et al., "Growing Use of Synlubes," *Hydrocarbon Processing*, vol. 61, No. 2., Feb. 1982, pp. 75–82.
*Teflon® PTFE 30 Fluorocarbon Resin*, Product Information sheet from DuPont (undated), 2 pages.

*Primary Examiner*—Thomas E. Denion
*Attorney, Agent, or Firm*—David G. Conlin; Peter F. Corless

[57] ABSTRACT

A method of formulating a nonflammable water based lubricant emulsion having excellent anti-seize and low friction properties for wood cutting and metal machining containing preferably an oil-in-water emulsion and finely divided polytetrafluoroethylene particles in the water phase and delivered in small amounts by mist or spray to the working parts.

23 Claims, 1 Drawing Sheet

WATER BASED LUBRICANT CONTAINING POLYTETRAFLUOROETHYLENE

CROSS-REFERENCE TO RELATED APPLICATION

This application is a continuation-in-part of patent application Ser. No. 07/890,723 filed Jun. 1, 1992 now abandoned.

BACKGROUND OF THE INVENTION

The invention relates to a multipurpose lubricant based on oil, water and PTFE and its use primarily in metal working and woodworking applications.

DESCRIPTION OF THE PRIOR ART

Petroleum based liquids of a proper viscosity and additive composition are the most common materials used to lubricate rubbing metal parts by maintaining a film between the metal surfaces to minimize friction and wear. Finely divided particles of polytetrafluoroethylene (PTFE) have been found to be useful in petroleum oils as an additive that further reduces friction.

Water based lubricants are commonly used in some metal working applications and in some lumber mill cutting operations. While having far less lubricity than petroleum oils, they have the advantage of non-flammability, lower cost, and greater cooling ability. The cooling capacity is important in cutting applications where heat accumulation leads to rapid blade dulling, resin buildup on wood saw blades and welding and short blade life in metal cutting operations. Water alone can cause corrosion problems. To correct that deficiency, and also to add lubricity, oil is added to a level of about 5% by weight, along with an emulsifier that disperses the oil uniformly in a milk white emulsion. Corrosion inhibitors, EP (extreme pressure) agents, and biocide additives may be predissolved in the oil portion, then dispersed with the oil throughout the emulsion. These solutions are commonly called "soluble oils" and are used extensively in cutting, grinding, and tapping operations in the metalworking industry.

A need exists, however, to improve the lubricity of soluble oils by lowering the friction to extend blade life and/or increase cutting speed that does not detract from, or interfere with, other necessary properties, such as emulsion stability, and that is easy to produce.

A further need exists for certain soluble oil applications to operate below the freezing point of water. The emulsion stability needs to be maintained with the addition of freezing point reducing liquids such as alcohols that lower the freezing point.

Soluble oil lubricity can be improved somewhat by adding oil soluble EP agents to the oil phase before emulsification. Another alternative contemplated by this invention is to add the lubricity agent to the water phase, rather than the oil phase.

SUMMARY OF THE INVENTION

One object of the present invention it to impart high lubricity to a water based composition applied primarily to metal tools used for cutting or working metal or wood. This is provided by a water-based lubricant composition comprising a lubricating oil-in-water emulsion and about 0.1–10% by weight of PTFE dispersed in the emulsion, the PTFE particles having a diameter of 0.05–20 μm. Preferably the water content of the emulsion is at least about 90% by weight and the oil content is less than about 10% by weight. In the preferred embodiment, the oil content is about 2–5% by weight, the PTFE particles are about 0.1–3% by weight of the composition and have a diameter of about 0.05–0.5 μm.

The composition of this invention may be made by mixing water, lubricating oil and emulsifier under sufficiently high agitation to form a stable oil-in-water emulsion. PTFE particles are then dispersed in the emulsion under sufficiently low agitation to avoid coagulation of the PTFE particles.

BRIEF DESCRIPTION OF THE DRAWINGS

The drawing schematically shows a system for dispensing the composition of this invention onto a tool to be lubricated.

DESCRIPTION OF THE PREFERRED EMBODIMENT

Figure 1:
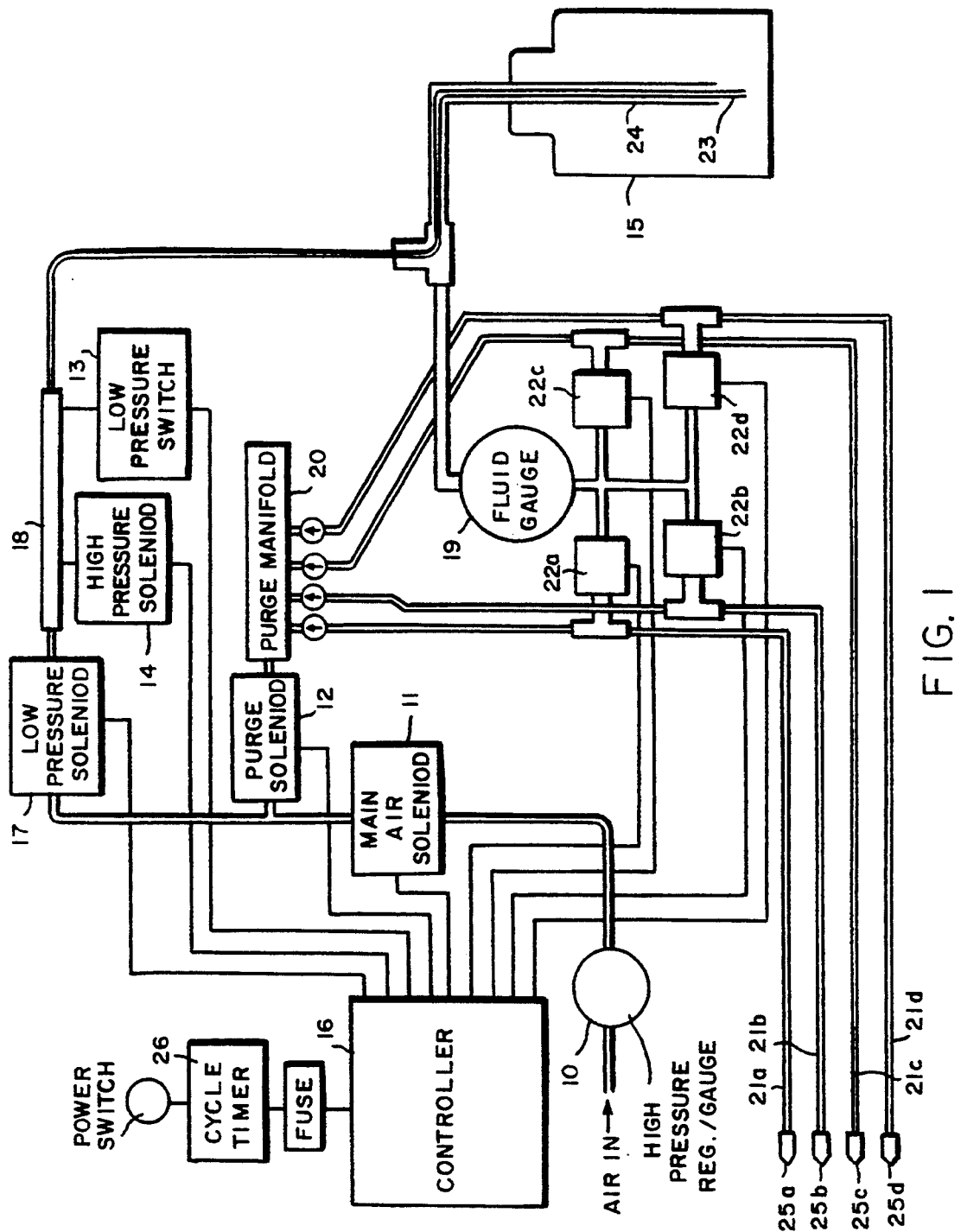

An improved soluble oil is prepared by admixing with water about 2–5% by weight of a suitable oil, optionally about 0.1–5% by weight of a rust or corrosion inhibitor such as calcium dinonylnaphthalene sulfonate, and about 0.2–5% by weight of an emulsifier such as a sodium petroleum sulfonate that includes an aliphatic glycol ether. These components are stirred under high agitation to result in a stable emulsion. This can be accomplished with high pressure pumps or mills or with a blender at 1000 rpm or higher. At slower stirring (about 5–30 rpm, for example) is added 0.1–10% by weight of an aqueous concentrate containing 60% by weight suspended PTFE particles in the diameter range previously discussed. Small amounts of base such as KOH, NaOH or NH$_4$OH are preferably added to adjust the pH to about 9–10.5 to increase the stability of the PTFE dispersion. The particles are small enough that they remain suspended for weeks. Once settled, on long term storage, they are readily redispersed with gentle agitation as by shaking, stirring or bubbling air through the liquid.

In addition to the aqueous phase suspension stability, the emulsion stability is also a key factor in a successful fluid. Soluble oils disperse initially to a milky white solution. Overnight they separate to a 5–10% by volume cuff at the top of emulsified oil with the water layer an opaque appearance.

Satisfactory emulsification of soluble oils is defined if there are no visible droplets or oil, or an oil layer on the top surface after 24 hours. The proper choice of an emulsifier is very important in creating both a satisfactory oil emulsion and a stable PTFE suspension.

Optional components useful to this invention are rust inhibitors and EP or antiwear additives either oil soluble (example: tricresyl phosphate—"TCP") or water soluble (example: sodium phosphate salts).

Another aspect to this invention is to alleviate the lower temperature limitations of the solution by substituting some of the water with alcohols, glycol or glycerine, preferably isopropanol up to 40% by weight to reduce the freezing point from −2° C. to as low as −20° C. At levels greater than 25% by weight isopropanol, the mixture would be classified as flammable.

The practical upper temperature limits for use of the invention is about 100° C. in a sump application. The preferred application of this invention is in spray applications on very high temperature cutting surfaces, well over the boiling point of the carrier solvent water. This type of a spray application provides a residue lubricant film consisting of PTFE and preferably a synthetic oil film on the hot metal surface acting as the cutting lubricant. The advantage of the oil being synthetic is its higher thermal stability above 100° C. and resistance to degradation at high surface temperatures compared to a petroleum oil. In general, however, the invention contemplates the use of various oils, either oil soluble or water soluble. Suitable oils can be petroleum derived napthenic or paraffinic oils. The preferred oils as noted are synthetics such as polybutenes or vegetable oils.

The lubricity properties of the oil compositions of this invention have been evaluated in a Falex test by the ASTM method D-3233 in which the rotating pin held in two "V" blocks is broken in for five minutes at a 300 pound load, then the load is allowed to increase unchecked until the pin welds to the "V" blocks at a certain load which is defined as the fail point. The friction coefficient is determined by recording the torque load on a strain gauge and dividing by the applied load.

Table 1 presents lubricity data that demonstrates the uniqueness of the combination of components with various emulsifiers. The formulations were all made by the process described above. The PTFE used was DuPont's Teflon® PTFE 30 having a particle size of 0.05–0.5 μm. Example 15 utilized canola oil. All other examples used the synthetic oil Mobil 61.

In the following Table 1 the emulsifiers listed are identified as follows:

Emulsifier

A ethylene propylene oxide copolymer (BASF Pluronic, p. 84)

B sodium sulfonate alkyl glycol ether (Ferro Base 8000 P)

C Cabot 166 (colloids, sequestrants, surfactants and wetting agents)

D Rohm Haas Triton XL80N, octylphenoxy-polyethoxyethanol far outperformed the normal operation which used no lubrication system.

In the food processing plant machine shop stainless steel cutting, Example 9 extended blade life over ten fold over a commercial soluble oil similar to Example 5.

Table 2

FIELD TEST RESULTS OF WATER BASED LUBRICANT

1. Food Processing Plant
Band saw cutting stainless steel plate
Commercial soluble oil
Sodium sulfonate emulsifier
For soluble oil 5% oil in water emulsion a typical Blade life is about 5 cuts or one day.

Example 9—blade life over 50 cuts during 5 week period.

2. Saw Manufacturer
Band saw cutting aluminum and stainless steel compared to reference mineral oil, Example 9 was able to cut faster and with less drag due to lack of melting and welding of soft metals to the blade.

3. Wood Cutting Operation 100 ft. Cut of 1-¼" Particle Board with 10 inch Radial Saw

| | Distance to Overload | Resin Build Up | Chipped Teeth | Dulled Teeth |
|---|---|---|---|---|
| No Lubricant | 30 ft. | Yes | Yes | Yes |
| Example 7 Sprayed Once Every 10 Feet | 50 ft. | No | No | No |

The present invention also provides a system for automating the delivery of the compositions described above. Accordingly, the invention provides a system for lubricating a tool comprising: providing a supply of

TABLE 1

LUBRICITY STUDY OF SOLUBLE OIL COMPONENTS

| | Composition - Weight Percent | | | | FALEX TEST ASTM D-3233 | |
|---|---|---|---|---|---|---|
| Example | Water | PTFE | Oil | Other | Fail Load (lb.) | Friction Coefficient at 1000 lbs |
| | | | | Emulsifier A | | |
| 1. | 100 | | | | 400 | |
| 2. | 93 | | 5 | 2 | 1900 | 0.16 |
| 3. | 97 | 3 | | | 2200 | 0.09 |
| 4. | 90 | 3 | 5 | 2 | 4500+ | |
| | | | | Emulsifier B | | |
| 5. | 94 | | 5 | 1 | 2500 | 0.066 |
| 6. | 92.5 | 1.5 | 5 | 1 | 4500+ | 0.063 |
| 7. | 95.9 | 0.6 | 2.5 | 0.5 | 0.5 TCP | 4500+ | 0.072 |
| 8. | 58.4 | 0.6 | 5 | 1 | 35% Isopropanol | 4500+ | 0.060 |
| 9. | 92.8 | 1.2 | 4 | 1 | 1.0% TCP | 5000+ | 0.060 |
| 10. | 95.5 | 0.45 | 2 | 0.5 | 0.15 TCP, 1.3% OMS | 4500+ | 0.060 |
| | | | | Emulsifier C | | |
| 11. | 83.8 | 1.2 | 4 | 10 | 1% TCP | 4500+ | 0.051 |
| 12. | 68.8 | 1.2 | 4 | 5 | 1% TCP + 20% Isopropanol | 4500+ | 0.060 |
| 13. | 96.8 | 1.2 | | 2 | | 3300 | 0.051 |
| 14. | | 1.2 | 98.8 | | | 4000 | 0.081 |
| | | | | Emulsifier D | | |
| 15. | 95 | 1.0 | 4% Canola Oil | 1 | 0.15% TCP | 4500+ | 0.057 |

In Table 2 are the results of actual cutting tests run with the Example 9 composition. In the wood cutting operation, Example 7 is a diluted form of Example 9 and a lubricating oil-in-water emulsion having dispersed in said emulsion about 0.1–10% by weight of PTFE particles having a diameter of about 0.05–20 μm, flowing said emulsion through a first conduit under pressure sufficiently low to avoid coagulation of the PTFE particles to a second conduit and discharging said emulsion from said second conduit under higher pressure onto the surface of the tool to be lubricated.

In the preferred embodiment the emulsion is discharged from the second conduit at a rate of about 1-10 ml every one to two minutes onto the surface of the tool to be lubricated, typically at a rate of about 4 ml every two minutes. The pressure in the first conduit is usually about 2-15 psig and the pressure in the second conduit is above about 70 psig.

In summary, the function of the present system's preferred embodiment is to inject a small amount of lubricating fluid under low pressure into a spray line and then force the fluid out of the line through an atomizing nozzle with a burst of high pressure air. These operations are broken down into two groups: (1) the air (pneumatic) functions, and (2) the fluid (spray) functions (controlled by a microprocessor-based programmable controller). These operations will now be described in connection with FIG. 1 of the drawing.

1. Pneumatic Operations:

Clean air enters the unit through the high pressure air filter/regulator 10. This regulator is set at 80 psig.

Air entering the unit is controlled by the main air solenoid 11. This solenoid closes automatically during normal shut down or in the event of certain failure conditions. Air passing through the main air solenoid is then divided between the low pressure circuit and the higher pressure purge circuit.

Low pressure operations: The low pressure circuit consists of a low pressure solenoid 17, a low pressure switch 13, and a high pressure switch 14. These components comprise a closed-loop feedback system that maintains a consistent pressure to force fluid out of the fluid bottle 15 and into the fluid system.

Operation of the low pressure system: When the pressure in the low pressure system falls below the low pressure set point (2 psig), the low pressure switch 13 opens sending a signal to the controller 16. Controller 16 then opens low pressure solenoid 17 allowing air to flow into low pressure manifold 18 until the pressure exceeds the low pressure set point. When low pressure switch 13 closes sending a signal to controller 16, low pressure solenoid 17 is closed.

The pressure in the low pressure circuit may be monitored visually with fluid pressure gauge 19. If the pressure in the low pressure circuit should exceed the high pressure set point (15 psig), high pressure switch 14 closes sending a signal to controller 16.

If high pressure switch 14 remains closed for a preset period of time (approximately ten seconds) indicating an operation failure condition, controller 16 stops all operations and turns off all solenoids. To restart operation, the unit must be switched off and then back on manually by the operator.

High pressure (purge) operations: Air entering high pressure purge manifold 20 is controlled by purge solenoid 12.

After fluid is injected at low pressure (2 psig) into spray lines 21a, 21b, 21c, 21d by spray solenoids 22a, 22b, 22c, 22d respectively, purge solenoid 12 is opened and the fluid is forced (purged) out of the line with high pressure (70 psig) air. This allows the efficiency of applying small amounts of lubricant with the advantages of high pressure injection to insure penetration of the laminar air barrier next to a high speed blade or tool.

Each time the system has completed the spraying routines, all the purges are turned back on to help keep the nozzles clean and free of chips and to assist in further cooling the blades or tools being lubricated.

2. Fluid Operations:

Fluid entering the unit is controlled by the low pressure circuit and the individual spray solenoids. Low pressure air is introduced into the lubricant bottle 15 through a small air tube 23 which is installed coaxially within a larger fluid tube 24. Fluid is then forced out of bottle 15 through fluid tube 24 and into the fluid circuit. The fluid pressure may be monitored with fluid pressure gauge 19.

When it is time to spray, controller 16 turns off air purge solenoid 12 and activates the individual spray solenoids allowing a metered amount of fluid into the spray lines 21a-21d. The air purge solenoid 12 is then reopened and the fluid is forced out of atomizing nozzles 25a-25d at high pressure. The duration of the opening of the spray solenoids during the spray cycle is controlled internally by controller 16. The frequency of the spray is controlled by adjustable cycle timer 26.

While the above embodiment utilizes four spray nozzles, it will be appreciated that the system can be set to deliver lubricant to sets of 1, 2 or 4 spray nozzles, or alternatively, the system can be made to accommodate larger operations such as 12-spray nozzles. While the preferred embodiment utilizes the spray technique of delivering lubricant compositions, the compositions can be applied by any other suitable technique, such as by emersion, flooding or fogging.

What is claimed is:

1. A method for lubricating a tool comprising:
providing a supply of a lubricating oil-in-water emulsion having dispersed in said emulsion about 0.1-10% by weight of PTFE particles having a diameter of about 0.05-20 μm, flowing said emulsion through a first conduit under pressure sufficiently low to avoid coagulation of the PTFE particles to a second conduit and discharging said emulsion from said second conduit under higher pressure onto the surface of the tool to be lubricated.

2. A method for lubricating a tool in accordance with claim 1 wherein the lubricating oil is present in said emulsion at about 2-5% by weight.

3. A method for lubricating a tool in accordance with claim 2 wherein said PTFE particles constitute about 0.1-3% by weight of said emulsion.

4. A method for lubricating a tool in accordance with claim 3 wherein said PTFE particles have a diameter of about 0.05-0.5 μm.

5. A method for lubricating a tool in accordance with claim 1 wherein said emulsion is sprayed from said second conduit to be discharged therefrom.

6. A method for lubricating a tool in accordance with claim 5 wherein said emulsion is discharged from said second conduit at a rate of about 1-10 ml every one to two minutes onto the surface of the tool to be lubricated.

7. A method for lubricating a tool in accordance with claim 6 wherein said emulsion is discharged at a rate of about 4 ml every two minutes onto the surface of the tool to be lubricated.

8. A method for lubricating a tool in accordance with claim 1 wherein the tool to be lubricated is a metal tool used for cutting or working metal or wood.

9. A method for lubricating a tool in accordance with claim 1, including a valve between said first and second conduits.

10. A method for lubricating a tool in accordance with claim 9 wherein the pressure in said first conduit is about 2–15 psig.

11. A method for lubricating a tool in accordance with claim 10 wherein the pressure in said second conduit is above about 70 psig.

12. The method of claim 1 wherein the water content of said emulsion is at least about 90% by weight and the oil content is less than about 10% by weight.

13. The method of claim 12 wherein a portion of the water of said emulsion is replaced by a freezing point reducing liquid.

14. The method of claim 13 wherein said freezing point reducing liquid is isopropanol.

15. The method of claim 1 wherein the PTFE particles have a diameter of about 0.05 to 0.5 μm.

16. The method of claim 1 wherein the emulsion has a pH of about 9 to 10.5.

17. The method of claim 1 wherein the emulsion is formed with an emulsifier comprising a mixture of sodium sulfonate and alkyl glycol ether and is present as about 0.2 to 5% by weight of the emulsion.

18. The method of claim 1 wherein the emulsion is formed with an emulsifier comprising octylphenoxypolyethoxyethanol and wherein the lubricating oil is canola oil.

19. The method of claim 1 wherein the lubricating oil is a synthetic oil having thermal stability above 100° C.

20. The method of claim 1 wherein the emulsion comprises an extreme pressure compound.

21. The method of claim 20 wherein the extreme pressure compound is tricresyl phosphate and is present in the amount of about 0.02 to 3% by weight of the emulsion.

22. The method of claim 1 wherein the emulsion consists essentially of oil, water and the PTFE particles.

23. The method of claim 1 wherein the emulsion consists essentially of oil, water, the PTFE particles, and one or more materials selected from the group consisting of a freezing point reducing liquid, an emulsifier, an extreme pressure additive, an antiwear additive, and a rust or corrosion inhibitor.

* * * * *